Oct. 17, 1933.  W. J. PASINSKI  1,931,115
ACCOUNTING MACHINE
Filed Aug. 8, 1928   5 Sheets-Sheet 3
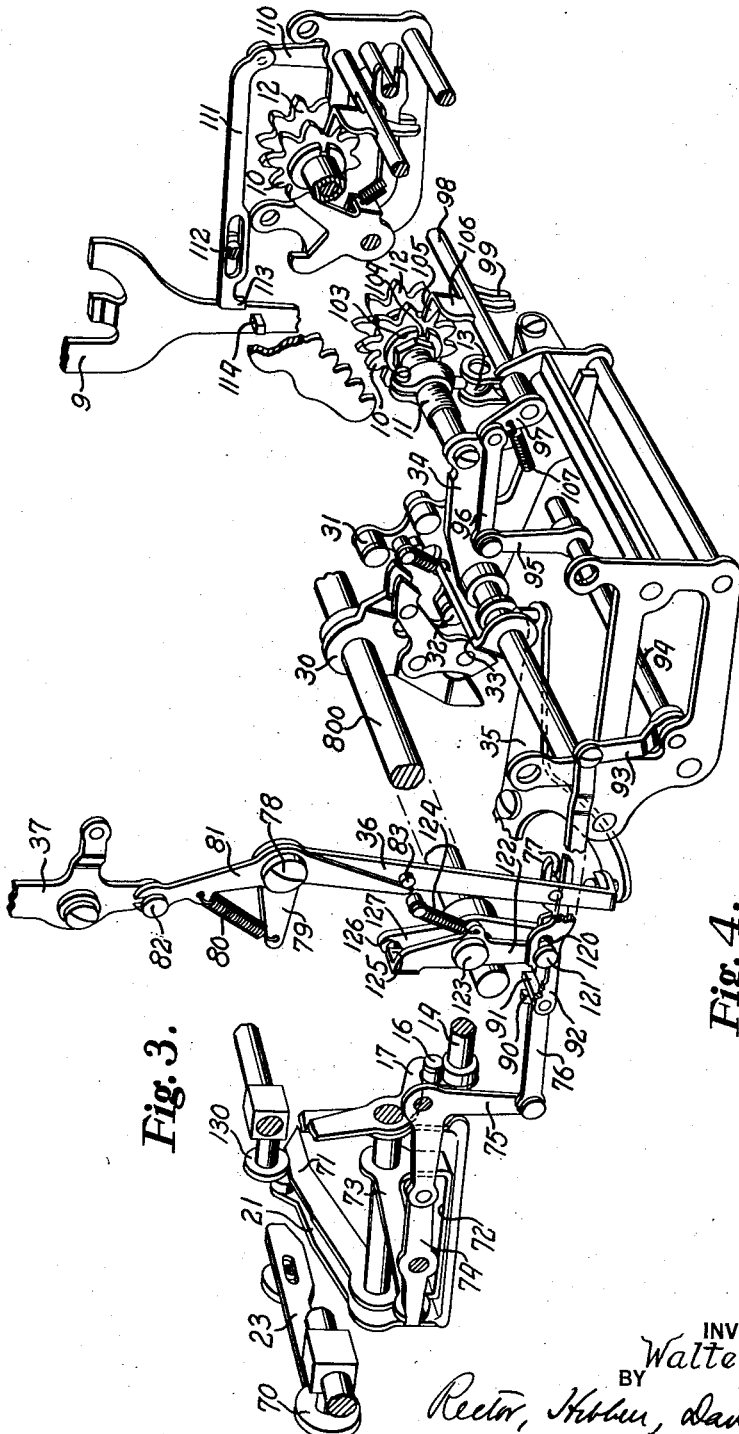
INVENTOR
Walter J. Pasinski
BY
Rector, Hibben, Davis, & Macauley
ATTORNEYS Oct. 17, 1933.  W. J. PASINSKI  1,931,115
ACCOUNTING MACHINE
Filed Aug. 8, 1928     5 Sheets-Sheet 4
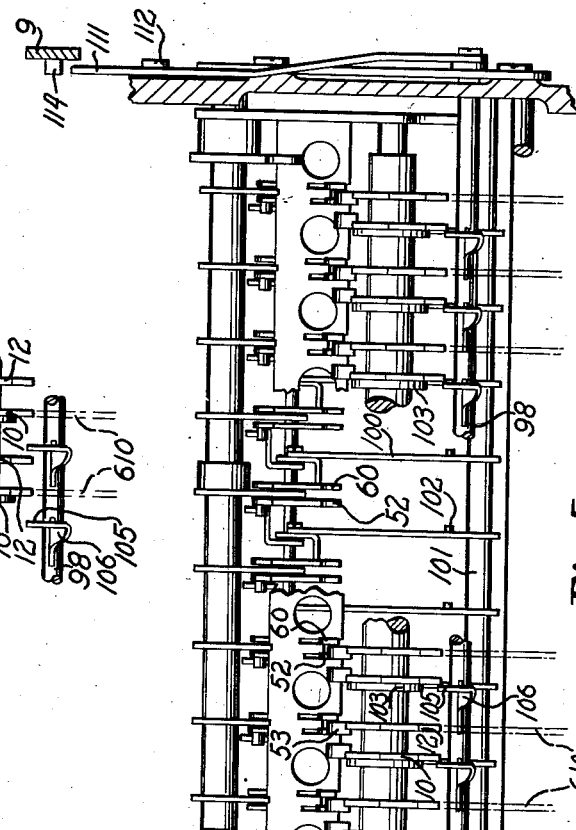
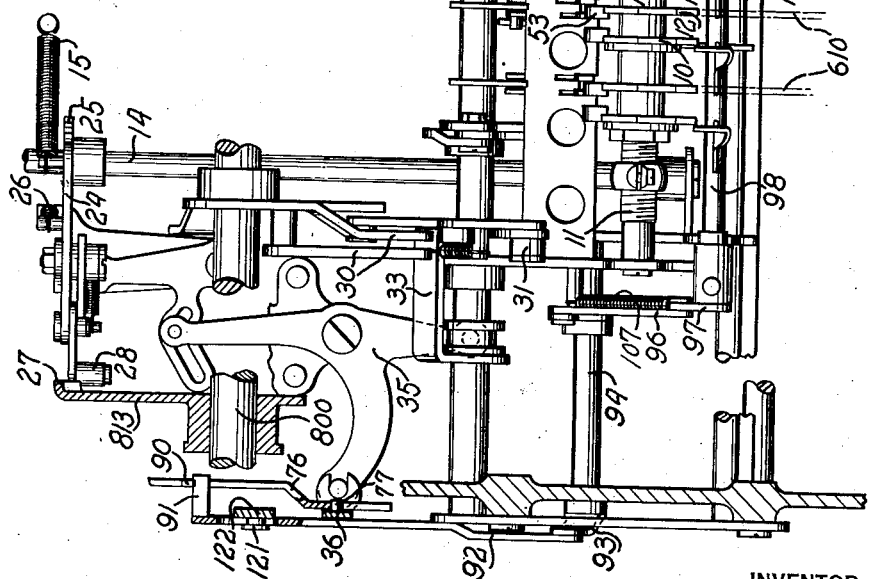
INVENTOR
Walter J. Pasinski
BY
ATTORNEYS Oct. 17, 1933.  W. J. PASINSKI  1,931,115
ACCOUNTING MACHINE
Filed Aug. 8, 1928   5 Sheets-Sheet 5
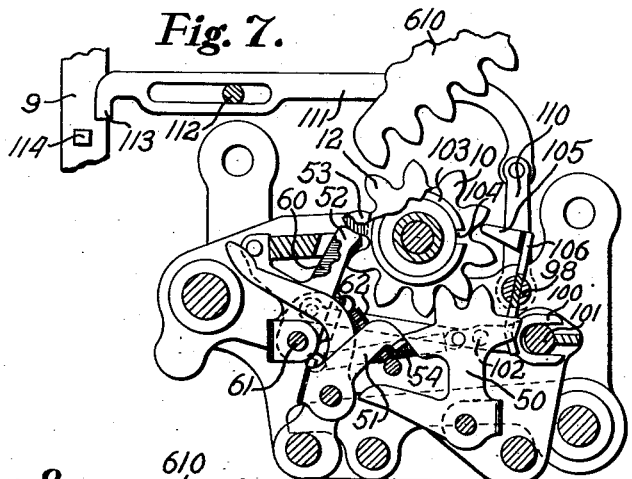
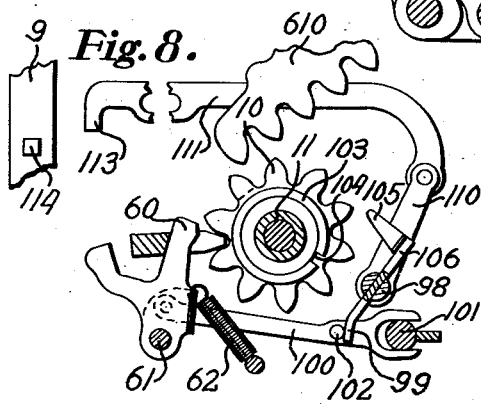
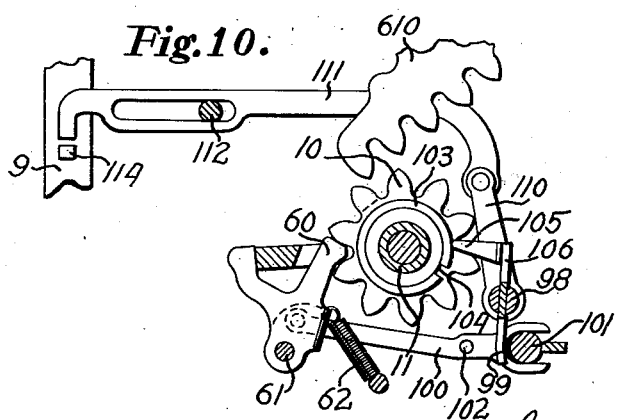
INVENTOR
Walter J. Pasinski
BY
Rector, Hibben, Davis, & Macauley
ATTORNEYS Patented Oct. 17, 1933

1,931,115

UNITED STATES PATENT OFFICE 1,931,115

ACCOUNTING MACHINE

Walter J. Pasinski, Detroit, Mich., assignor to Burroughs Adding Machine Company, Detroit, Mich., a corporation of Michigan Application August 8, 1928. Serial No. 298,252

8 Claims. (Cl. 235—60)

This invention relates to an accounting machine. It relates particularly to a construction for proving the accuracy of the entries made on such a machine by automatically preventing operation of the machine unless the entry made in a predetermined column corresponds exactly to an entry made in a prior predetermined column.

Accounting machines are carefully built so as to operate accurately when properly manipulated. If an operator enters an item correctly and manipulates the machine to perform a desired function, he may be sure of a correct result. It is possible, however, for an operator to incorrectly enter an item on a machine, either through misreading the item or through misoperation of the machine. This may occur in one of a long series of entries with the result that, at the end of the series, or at some subsequent time, it is discovered that an error has been made after which the entire series of operations must be checked and the work done over again. In order to avoid this it is desired to have a check on the accuracy of the operator and the present invention is directed to this end.

The nature of the invention will be more easily understood by first describing a typical series of operations that is followed in using a machine of this character, the sample chosen being the posting of a commercial ledger.

In the posting of a commercial ledger, the operator inserts the ledger sheet in the machine and picks up the customer's old balance. He reads this from the old balance on the ledger and, when he enters it on the amount keys and operates the machine, this old balance is printed in the "pickup" column on the ledger sheet and is entered in one of the counters of the machine. The carriage then automatically tabulates to the "charges" column where additional charges against the customer's account are entered and added to the old balance and printed. It is the usual practice to post charges and credits separately and it will be understood that if credits are to be posted the carriage will be tabulated to the "credits" column instead of the "charges" column where the customer will be credited with any payments on his account, said credits being subtracted from the balance and printed in the "credits" column. Of course, the carriage can be adjusted to tabulate to the "charges" column first and then to the "credits" column if it is desired to post both charges and credits at the same time. After the entry has been made in the "charges" column in the example described, the carriage automatically tabulates to the "balance" column where a new balance is taken by taking a sub-total, which results in printing the new balance in the appropriate column on the ledger sheet, but leaves the balance in the counter. The machine then automatically tabulates to a "proof" position and, as a check on the work of the operator in entering the old balance in the "pickup" column, he is required to enter the old balance a second time. This entry is made in the "proof" column by again reading the old balance from the entry on the ledger from which it was first read. If he made a mistake in reading the old balance the first time or if he misoperated the machine in the "pickup" column, the chances are that he will not make the same mistake the second time, but will enter the old balance correctly in the "proof" position. The two entries are then checked against one another. This may be done by observation of the printed results, which is slow and unsatisfactory. Machines have been provided in which an operator may depress a special key after the second entry to cause a character to be printed to indicate that no mistake has been made. If a mistake has been made, the special key cannot be operated which notifies the operator that an error has occurred. The difficulty with this is that it not only requires an extra operation but it also is not an absolutely sure check because the operator may, through negligence or intention, forget to operate the special key to test the accuracy of the work.

In bookkeeping and accounting work, accuracy is absolutely necessary, but speed is also highly desirable. Insofar as possible a machine used for this work should be automatic and independent of the human element. If an error has occurred, it is not satisfactory to merely have the operator notified or to provide some special device by means of which he can test the correctness of the operation, because he may fail to see the signal or he may forget to make the test. A much more satisfactory operation, and an operation provided by the present invention, is to automatically prevent further operation of the machine when an error occurs. This not only notifies the operator that an error has been made, but it also prevents him from disregarding or overlooking it. The chances for error are thus not only minimized, but the operation of the machine is also simplified, because the operator does not have to watch for a special signal or operate a special key to test for errors. The speed of operation is also increased and, in the present invention, this speed is further increased by the provision of means for automatically releasing the locked machine as the carriage is moved back to the position where the posting is to start over again.

The present invention comprehends the provision of a proving mechanism in which the old balance is set up at the same time that said balance is entered in the machine in the "pickup" column. This proving mechanism is then automatically rendered inactive during subsequent operations of the machine and until the "proof" column is reached where the old balance is to be entered the second time. When this column is reached, the proving mechanism is rendered active again and it receives the old balance as entered the second time, the mechanism being constructed in such a way that if the second entry of the old balance does not correspond to the first, further operation of the machine is prevented. In addition to this general feature, the invention includes other special features which will appear later as the invention is described in more detail.

The general object of the invention is, therefore, to provide an improved automatic proving mechanism in an accounting machine.

A more particular object is to provide a proving mechanism which will act automatically to prevent further operation of the machine when an error has occurred without requiring the manipulation of any special device by the operator.

A further object is to provide a proving mechanism which will facilitate more speedy operations, be more definite in its action, and simplify the work of an operator.

Other objects and advantages of the invention will hereinafter appear.

An embodiment of the invention is illustrated in the accompanying drawings in which,—

Fig. 3 is a skeleton perspective view illustrating the main parts of the proving mechanism.

Fig. 4 is a plan view of the upper portions of form sheets used with the machine, an example of work being shown thereon.

Fig. 5 is a partial plan view showing the proving mechanism in position in the "pickup" column of the carriage before the machine has been operated.

Fig. 6 is another partial plan view showing the proving mechanism in position for active operation with the actuator racks of the machine, but prior to the time it has moved to position to prevent operation of the machine.

Fig. 7 is a sectional side elevation showing the transfer mechanism associated with one of the counters and the means for preventing operation of the machine, the parts being shown in the position they occupy in the "pickup" column, that is, in the column in which the old balance was first entered in the machine.

Fig. 8 is a sectional side elevation similar to Fig. 7, but with some of the parts omitted and with the parts shown in the position they occupy when the carriage is in the first "proof" position, that is, in the position where the old balance is entered a second time.

Fig. 9 is another sectional side elevation similar to Fig. 7, but with some of the parts omitted and showing the parts in the position they occupy when no error has been made; and Fig. 10 is a sectional side elevation similar to Fig. 9 showing the position of the parts when an error has been made.

Figure 1:
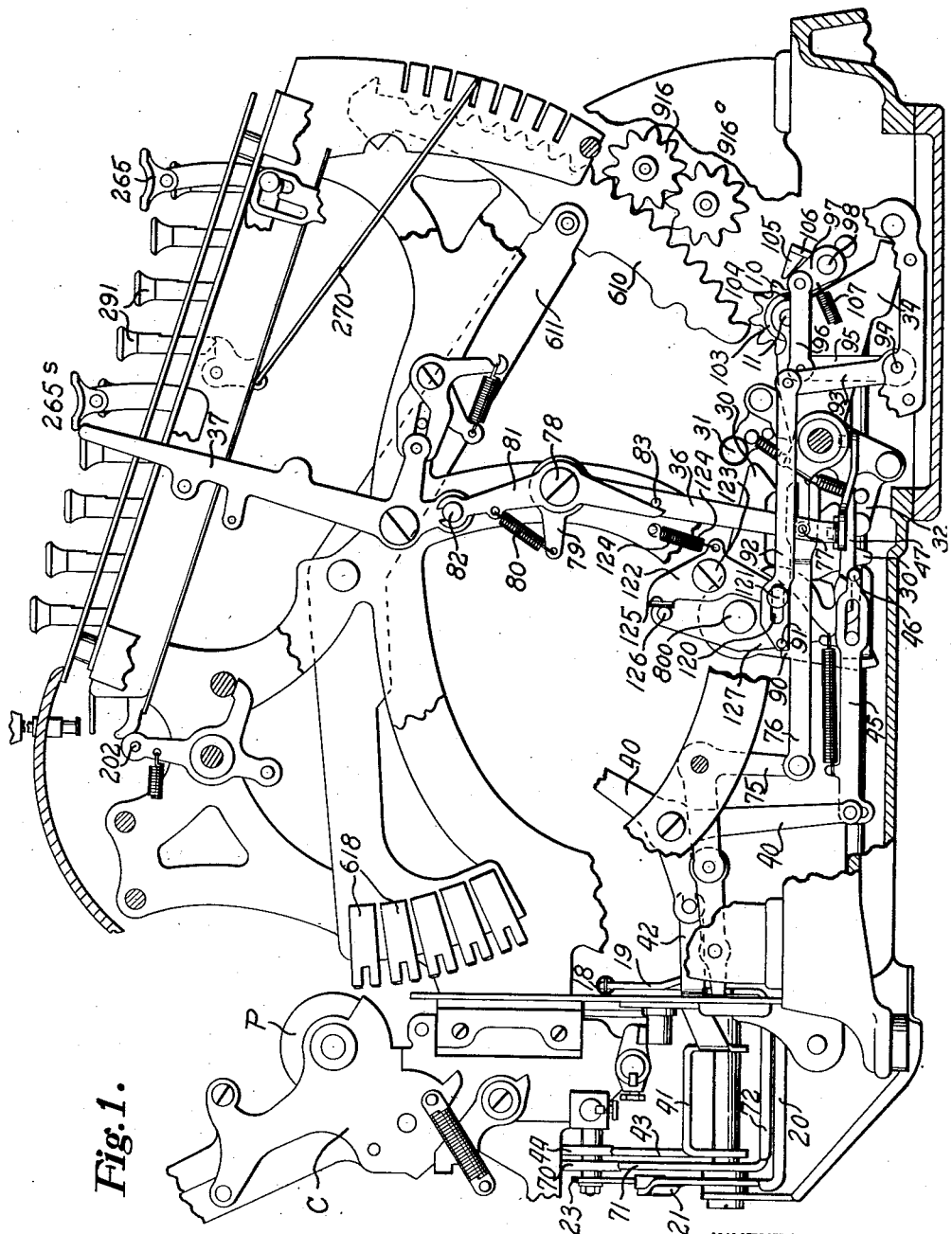
Figure 1 is a left side elevation of a Burroughs accounting machine with the invention applied thereto, said view showing only the pertinent parts of said machine in order to avoid confusion.

The invention is shown applied to a Borroughs accounting or bookkeeping machine, the general features of which are so well known in the art that they will be described only briefly here. It is to be understood that the invention may also be used with any other suitable type of machine.

The machine includes the usual amount keys 291 which, when depressed, move stop wires 270 to differentially position actuator racks 610 that are released for descent upon operation of the machine. The actuator racks are carried on the forward ends of arms 611 whose rear ends carry type bars 618 which are positioned relative to a platen P on a traveling paper carriage C. When the types 618 are properly positioned relative to the printing line, they are driven into engagement with the paper on the platen by means of a hammer mechanism, not shown, but which is well known in the art and described in several Burroughs patents, for example, No. 505,078. The paper carriage C is tabulated from column to column by a tabulating mechanism and automatically returned by means of mechanism described in Rinsche Patent No. 1,580,534. Cooperating with the actuator racks 610, is a counter 916 which, for purposes of convenience in this application, will be referred to as the main counter. Associated with this main counter is another set of counter pinions 916c by means of which the pinions of counter 916 may be reversely rotated to perform subtraction. The machine is provided with a suitable means for conditioning the machine for addition or subtraction on the counter 916, said conditioning means not being illustrated in the present case, but being described in Rinsche Patent No. 1,172,484. The counter 916 is rocked into and out of engagement with the actuator racks 610 at the proper time to perform addition and subtraction by the usual Burroughs pitman and associated devices, and a total key 265 is provided for conditioning these parts to take a total. A subtotal key 265s conditions the parts for the taking of a subtotal, both the total and the subtotal being taken in the well known manner by rotating the main counter pinions 916 to zero by means of the actuator racks, the latter being thus positioned by the counter. The usual restoring bail 202 is provided for restoring the keys to normal at the end of each operation of the machine. The machine is motor driven and the motor drive is controlled by a link 9 (Fig. 3) that is operated by a motor bar as described in Vincent Patent No. 866,750.

*The proving mechanism*

The proving mechanism includes a special set of pinions 10 (Figs. 2 and 3) mounted on a longitudinally reciprocatory shaft 11 which is automatically controlled by the paper carriage to position the pinions for active cooperation with the actuator racks 610 in predetermined columnar positions of the carriage. The shaft 11 which carries the pinions of the proving mechanism can also be used to support other sets of pinions making up counters used for addition, totals, subtotals, etc., two additional sets 12 being illustrated in the drawings. For the sake of convenience in description, the counters 12 will be referred to as the secondary counter.

Figure 2:
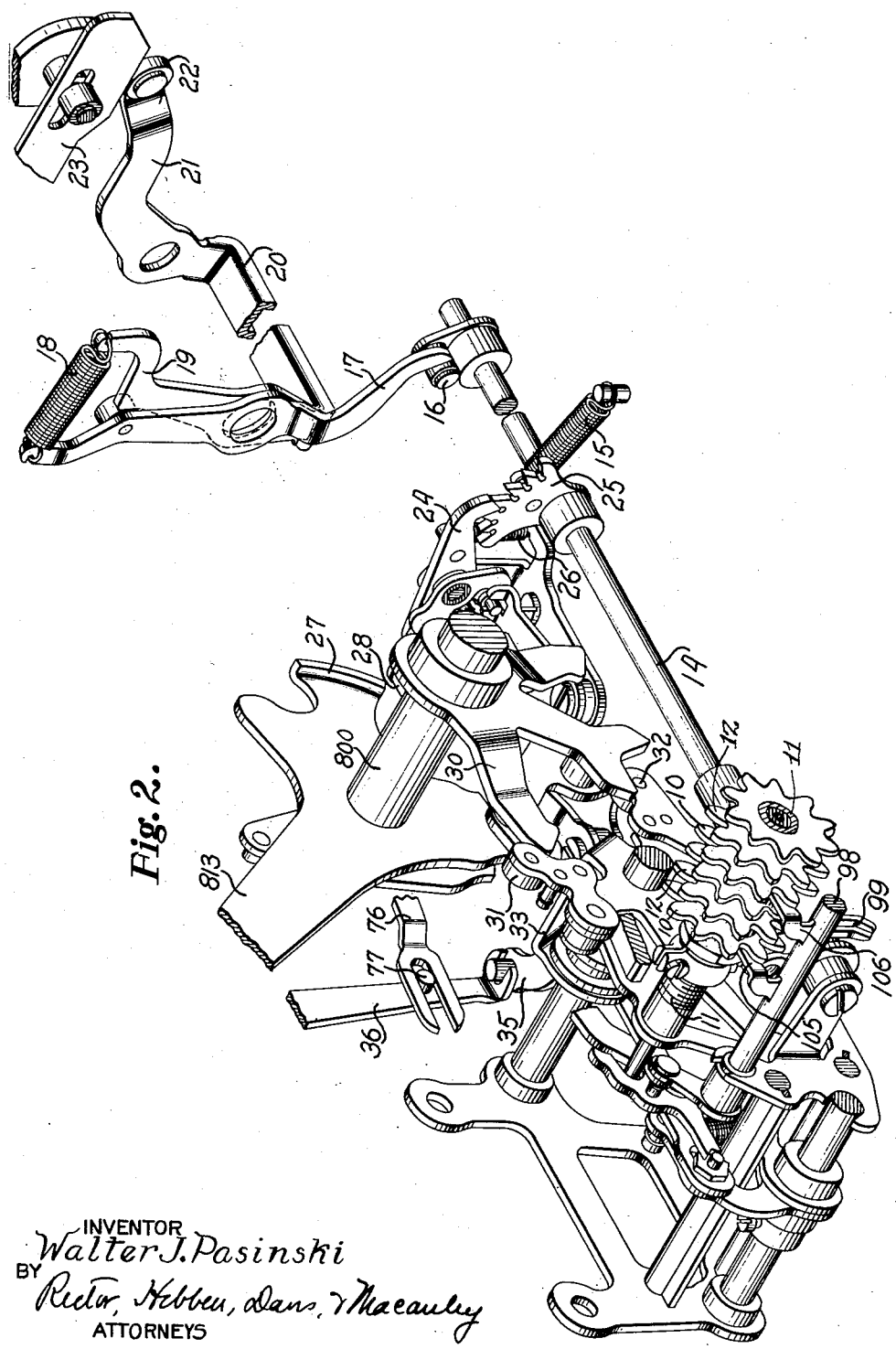
Fig. 2 is a skeleton perspective view of the carriage controls for automatically selecting the desired counters for operation.

The shaft 11 is moved longitudinally through a universal joint 13 which connects it to a second shaft 14 that extends to the rear of the machine as illustrated in Fig. 2.

The shaft 14 is urged clockwise, as viewed in Fig. 2 by a spring 15 so that the shaft 11 is normally urged to the right. Its movements are controlled through a stud 16 carried by an arm on the shaft, which stud engages a lever 17 connected by a spring 18 to one arm 19 of a yoke 20 whose other arm 21 carries a roller 22 engaged by a cam plate 23 supported by the carriage. The shaft 14 is normally locked against movement by a pawl 24 having a nose that is adapted to engage the teeth of a sector 25 fixed to a shaft 14. The pawl is urged to locking position by a spring 26. It is released during the forward stroke of the machine by the lever 813 which rocks clockwise during said forward stroke. This lever 813 has a laterally projecting flange 27 that engages a pass-by pawl 28 on pawl 24 as the lever moves to release the shaft 14. This permits the shaft 14 to move during the forward stroke of the machine and while the pinions are out of engagement with the actuator racks, thereby avoiding interference between the pinions and said racks as the shaft 11 is moved longitudinally. If, at the time the shaft 14 is released, the cam plate 23 occupies a position that permits upward movement of the roller 22, the spring 16 will rock shaft 14 clockwise (Fig. 2), the stud 16 rocking lever 17 and yoke 20 until the roller 22 engages the cam plate whereupon the parts will be arrested in selected position. If the cam plate 23 has moved the roller 22 downward, the spring 18 will have been tensioned and if the shaft 14 is then released the spring 18 will overcome spring 15 to rock the shaft 14 counterclockwise to selected position. After the shaft 14 has been moved to selected position during the forward stroke of the machine, it is again locked by the pawl 24 and it remains locked during the return stroke of the machine.

The pinions on the shaft 11 are rocked into and out of engagement with the actuator racks 610 by means of a cam 30 (Figs. 2 and 3) fixed to a rock shaft 800 which is oscillated at each operation of the machine. The cam engages pass-by pawls 31 and 32 on a slidable yoke 33 which is connected by a link 34 to the shaft 11. The yoke 33 may be moved laterally by means of a bell crank lever 35 to position the pawls 31 and 32 for engagement by different surfaces on the cam 30. The bell crank lever 35 is operated by a lever 36 which, in turn, is moved by a hand controlled lever 37. In the normal position of the parts, the hand lever 37 occupies a central position such as shown in Fig. 1. The pinions are normally out of engagement with the racks and they remain out during the descent of the racks to differential positions determined by the amount key stops. Before the racks ascend the pinions are rocked into engagement with them and then, at the end of the operation, the pinions are rocked out of engagement and moved to their normal position. In other words, the parts are normally conditioned in what may be termed addition condition.

When the lever 37 is pulled forward from its central position, the controls are positioned to take a total, and when it is moved backward from its central position, the parts are conditioned to take a subtotal, it not being considered necessary to describe these operations in detail.

A disabling or non-add mechanism for keeping the pinions on shaft 11 out of engagement with the racks during both the forward and return strokes of operation of the machine is provided. This mechanism is automatically controlled by the paper carriage and by a key (not shown). It is of the type described in detail in my copending application, Serial No. 123,397, filed July 19, 1926, now Patent No. 1,778,506. Briefly, it comprises a lever 40 (Fig. 1) controlled by the carriage through a yoke 41 having an arm 42 connected to lever 40 and a second arm 43 positioned to be engaged by a roller 44 on the carriage. The lever 40 is connected to a link 45 carrying a stud 46 which, when the link is pulled rearwardly, is positioned so that, as the machine is operated, a lever 47 is moved to disable the pawl 32. Accordingly, the cam 30 does not rock the pinions into engagement with the racks and the pinions remain inactive.

A transfer mechanism is provided for the set of pinions 12 on the shaft 11 the same being illustrated in side elevation in Fig. 7. This mechanism is described in my copending application, Serial No. 123,397, and an understanding of the details of it is not necessary for an understanding of the present invention. It includes a series of transfer segments 50 (Fig. 7) controlled by detents 51 that, in turn, are controlled by trip pawls 52 that are tripped by transfer projections 53 on the counter pinions. When a pinion 12 rotates clockwise, as viewed in Fig. 7, its transfer projections 53 cams its pawl 52 counterclockwise when the pinion moves from its "9" to or through its "0" position. This releases the transfer segment for the pinion of next highest order and the segment is moved by its spring 54 to effect a transfer.

When a total is taken, the pinions, such as pinions 12, are rocked into engagement with the racks before the racks descend and the pinions are then rotated counterclockwise by the racks as they descend. During this operation, when a transfer projection 53 of a pinion reaches its trip pawl 52, said pawl engages the projection to block movement of the pinion which is thus arrested in its "0" position. In this manner, the actuator racks are differentially positioned by the counter pinions in accordance with the total in the counter to permit a total to be obtained and printed.

No transfer mechanism is provided for the pinions 10 of the proving mechanism as it is not necessary to provide for a transfer. It is desirable, however, to have some means to stop the pinions 10 in "0" position when they are reversely rotated in order that they may be cleared and a simple construction has been developed for this purpose. This comprises a series of stop pawls 60 (Fig. 8) similar to the pawls 52 of the transfer mechanism just described. These pawls 60 are pivoted to rock on the shaft 61 which also carries pawls 52, but the pawls 60 are movable independently of the shaft and of said pawls 52. Pawls 60 are urged clockwise as viewed in Fig. 8 by springs 62 of which there is one for each pawl. They are thus urged to a position such as illustrated in Fig. 9 where they serve to arrest the pinions 10 in "0" position when said pinions are reversely rotated, that is, rotated counterclockwise as viewed in Figs. 8 and 9.

When the paper carriage C is in its "pickup" position, the connections controlling the longitudinal position of shaft 11 are conditioned so that the pinions 10 of the proving mechanism are in position for active cooperation with the actuator racks, such position being illustrated in Fig. 6. The control lever 37 occupies a central position and the devices for rocking the pinions into and out of engagement with the racks 610 are conditioned in what has been termed addition condition. When an item is entered on the amount keys and the machine given a stroke of operation with the machine in this condition, said item will not only be entered on the main counter 316, but it will also set the special pinions 10 forming a part of the proving mechanism. In other words, the item is set up in the proving mechanism at the same time that it is entered in the machine.

The carriage then tabulates to its next columnar position and the proving mechanism is automatically rendered inactive through control of the shaft 11 by said carriage, the cam 23 being set to move the shaft 11 longitudinally to move pinions 10 out of position for cooperation with racks 610. This allows the machine to perform subsequent operations independently of the proving mechanism. If it is not desired to use any of the other secondary counters, as, for example, the counter 12, it is not necessary to move the shaft 11 longitudinally. Instead, the controls for rocking shaft 11 may be automatically non-added through the connections heretofore described. Should it be desired to use one of the secondary counters as, for example, the counter 12, the controls on the paper carriage for longitudinally positioning the shaft 11 are arranged to not only move the pinions 10 out of active position but to also position the secondary counter 12 for operation.

After the machine has performed the desired number of operations independently of the proving mechanism, the carriage is tabulated to the "proof" position where the item entered in the "pickup" column is again entered on the amount keys and the machine given a stroke of operation.

As the carriage reaches its "proof" position, a large roller 70 (Fig. 3) engages one arm 71 of a pivoted yoke 72 having another arm 73 provided with a bifurcated end engaging the end of a pivoted lever 74. The lever 74 is, in turn, connected to one arm of a bell crank lever 75, whose other arm is connected to a link 76 extending forward toward the front of the machine. The forward end of the link 76 is bifurcated and it straddles a stud 77 on the arm 36 which controls the condition of the mechanism for rocking the pinions 10 and 12 into and out of engagement with the actuator racks.

A connection has been provided between the levers 36 and 37 to permit automatic operation of the arm 36 by the carriage without affecting the position of the control arm 37 which is left in its central position. Lever 36 is pivoted loosely on a stud 78 and it has a laterally projecting arm 79 connected by a spring 80 to the upper end of a lever 81 also pivoted loosely on stud 78. The upper end of lever 81 straddles a stud 82 on the control arm 37 and the lower end of said lever bears against a stud 83 on the arm 36. This connection permits the lever 36 to be rocked counterclockwise while the control lever 37 remains in central position, such movement of the lever 36 merely stretching the spring 80. This spring serves to return the lever 36 to normal position when the parts are released and it will be observed that the connection is such that although it yields to permit automatic operation of the lever 36, the lever 37 may, nevertheless, rock the lever 36 in either direction, the movement in one direction being positive through stud 83 and in the other direction yielding through the spring 80.

When the carriage reaches its "proof" column the roller 70 depresses the arm 71 and, through the arm 73, the lever 74, the bell crank 75 and the link 76, the lever 36 is rocked counterclockwise to position the control mechanism as if a total were to be taken from the pinions 10. In other words, the controls are conditioned to rock the pinions 10 into engagement with the racks prior to the descent of the latter so that, as the racks descend, they tend to rotate the pinions in a direction opposite to that in which they were rotated when the old balance was set in the proving mechanism in the "pickup" column. The pinions 10 are not arrested in "0" position by the pawls 60 and they do not arrest their actuator racks as occurs in usual total taking operations in the art. Instead, the position of the racks is determined by the stop wires 270 which are set by the amount keys upon the second entry of the old balance in the proof column. The pinions 10 are rotated to "0" only when the racks are thus stopped in the same position as when the old balance was first entered.

In order to prevent the pawls 60 from arresting the pinions 10 in "0" position, mechanism is provided which automatically disables said pawls in the "proof" position of the carriage. The link 76 has an upstanding lug 90 positioned to engage a lateral lug 91 on a link 92 connected to an arm 93 fixed to a shaft 94. The shaft 94 carries another arm 95 connected by a link 96 to an arm 97 fixed on a shaft 98 extending across the front of the machine and suitably journaled in frame plates. The shaft 98 carries a series of bifurcated lugs 99 (Figs. 3 and 8), said lugs straddling links 100 connected at their rear ends to the pawls 60 associated with the pinions 10. The forward ends of the links are guided by a frame shaft 101 upon which the forward bifurcated ends of the links 100 are slidably mounted. Each link 100 has a stud 102 positioned to be engaged by its associated lug 99 whenever the shaft 98 is rocked far enough clockwise from the position of Fig. 9. The shaft is so rocked when the carriage reached the "proof" column by means of the connections above described including the link 76, lugs 90—91, link 92, arm 93, etc. When this occurs the lugs 99 move the links 100 rearwardly and disable all the pawls 60 (Fig. 8). Consequently, when the pinions 10 are rotated reversely during the descent of the actuator racks in the "proof" column, they are not stopped by their pawls 60 and they do not limit their actuator racks. Instead, said racks are limited by the stop wires 270 which are positioned by the amount keys that have been depressed by the second entry of the old balance in the "proof" column. The pinions 10 are arrested in "0" position only when the amount keys depressed in the "proof" column correspond to the old balance as set in the proving mechanism.

If the entry of the old balance in the "proof" column does not correspond to the old balance as set up in the proving mechanism, the pinions 10 control a mechanism for preventing further operation of the machine as follows:

Each of the pinions 10 has an annular shoulder 103 (Figs. 3 and 5) provided with a slot 104 for the reception of a pointed nose 105 on a projection 106 fixed to the shaft 98, there being a projection for each of the pinion shoulders. The shaft 98 is urged counterclockwise by a spring 107 connected to the arm 97 to cause the noses 105 of the projections 106 to enter the slots 104 in the shoulders 103 when the slots are aligned with the noses. The right-hand end of the shaft 98 has an arm 110 fixed to it, which is connected to a link 111 slidable on a frame stud 112 and having a downwardly extending projection 113 adapted to pass back and forth over a stud 114 on the bar 9 which controls the motor drive for giving the machine a stroke of operation. The machine has the usual starting bar, shown in the Vincent patent referred to, which, when depressed, draws upwardly on a spring that is connected to the bar 9. This tends to raise the bar and, if the bar is raised sufficiently, the driving mechanism is conditioned to give the machine a stroke of operation. However, if the bar is blocked against rising, depression of the motor bar merely tensions the spring referred to without raising the link 9, in which event the driving mechanism is not conditioned and the machine will not be operated.

The slots 104 in the shoulders 103 on the pinions 10 are located so that, when the pinions are in their "0" positions, the slots are in position to receive the noses 105 of the projections 106. Accordingly, when all the pinions 10 are in "0" position, the noses may move to the position illustrated for one of them in Fig. 9, whereupon the shaft 98 rocks the lever 110 to move link 111 to the position shown in Fig. 9, that is, to a position such that the projection 113 is beyond the stud 114 on the starting link 9. In this position of the parts, the link 9 may rise when the motor bar is depressed and the machine may be given a stroke of operation. However, if one or more of the pinions 10 of the proving mechanism is not in "0" position, the nose 105 for the pinion which is out of "0" position will strike the shoulder 103 of its pinion and the shaft 98 with its arm 110 and link 111 will be blocked in the position illustrated in Fig. 10 where the projection 113 of the link 111 is directly above the stud 114 on the starting link 9. Under these conditions, the link 9 cannot rise and depression of the motor bar will not give the machine a stroke of operation.

The noses 105 on the projections 106 are relatively thin and it will be observed, by referring to Fig. 6, that, when the pinions 10 are positioned for engagement with the actuator racks, the shoulders 103 on the pinions are out of alignment with the noses 105 so that the noses may move freely without engaging any of the shoulders. In the embodiment of the invention shown, it is only when the counter 12 is aligned for operation with the actuator racks that the shoulders 103 on the pinions 10 are in alignment with the noses 105.

In order that the noses 105 may not interfere with the longitudinal shifting of the pinion shaft 11, these noses are rocked clockwise out of active position at each operation of the machine. The link 92 by means of which the shaft 98 is rocked through the connections 93, 94, 95 and 96 has a slot 120 in it in which engages a stud 121 on an arm 122 pivoted at 123. This arm is urged counterclockwise by a relatively strong spring 124 to cause a lateral lug 125 on the arm to engage a stud 126 on an arm 127 fixed to the shaft 800 which is oscillated at each operation of the machine. The 800 shaft is rocked counterclockwise (Fig. 3) during the forward stroke of the machine and then returned clockwise as the machine is given its return stroke of operation. As said shaft rocks counterclockwise, the stud 126 moves away from the lug 125 and the spring 124 moves the arm 122 counterclockwise, stud 121 picking up the link 92 and rocking the shaft 98 counterclockwise to thereby move the noses 105 away from any position in which they would interfere with the longitudinal shifting of the pinions 10 and 12. It will be recalled that the shaft 11 is unlocked and shifted, when it is shifted, during the forward stroke of the machine. The above described movement of the noses 105 is thus coordinated with the shifting movement of shaft 11 so as not to interfere with the pinions. This rocking movement of the shaft 98 also rocks the bifurcated projections 99 rearwardly, but the movement of the shaft is not sufficient to cause these projections to engage the studs 102 and hence the pawls 60 are not disabled during this operation. These pawls are only disabled when the link 92 is moved by means of the connections 76—90 which push the link forward, the movement in such event being slightly greater than when the link is moved forward by the arm 122. The slot 120 permits the link 76 with its lug 90 to move the link 92 forward without disturbing the arm 122.

After the machine has been given a stroke of operation in the "proof" column, the carriage tabulates to another column which, for the purposes of the present description, will be called the "second proof" column because, in the embodiment shown, the charges are again printed in this column and may be totaled for the day. The carriage connections for controlling the shaft 11 are such that, in this column, the counter 12 is moved to position for cooperation with the actuator racks, and it will be noted, by referring to Fig. 5, that, in this position of the shaft 11, the pinions 10 are positioned so that the shoulders 103 are in alignment with the noses 105 of projections 106. The carriage tabulates to the "second proof" position at the end of the stroke of operation given the machine while it is in "proof" column where the old balance was entered a second time and the pinions 10 reversely rotated. At the end of said stroke of operation the shaft returns to its normal position and, if all the pinions 10 were rotated to their "0" positions, said shaft and its associated parts move to the position illustrated in Fig. 9 where the stud 114 in link 9 is free to move and the parts are in condition to permit operation of the machine in the second "proof" column. On the other hand, if any of the pinions 10 were not rotated to "0" position in the "proof" column, the shaft 98 and its associated link 111 will be arrested in the position illustrated in Fig. 10 and the machine cannot be operated in the "second proof" column. If this occurs, the operator is immediately notified that an error has been made and he is notified without requiring that he observe any special signal or without requiring the manipulation of any special key for testing the accuracy of the work done. He is automatically notified by his inability to operate the machine when he tries to operate it in the "second proof" column.

If no error has been made the machine may be operated and, in the embodiment shown, the operation is as follows:

In the "proof" column the machine is conditioned for subtraction from the main counter 916. At the time this occurs, the main counter contains the new balance. When the machine is operated in the "proof" column, the old balance has been entered on the amount keys, and with the machine conditioned as specified, this old balance is subtracted from the new balance in the main counter which, assuming the operations have been correct, should leave the "charge" in the main counter. At the same time the pinions 10 are rotated to "0" position as just described. Now, when the machine is tabulated to the "second proof" position, it is conditioned to take a total from the main counter, which is cleared, and to transfer said total to counter 12, such transfer taking place through the manipulation of suitable control devices described in Patent No. 1,778,506. Counter 12 is thus utilized to accumulate the "charge" for each of the ledger sheets posted and, at the end of a run, a total may be taken from counter 12 to get a total of the charges. It will be understood that, while this is a desirable method of using one of the multiple counters 12, in connection with the proving mechanism, it is not necessary, as far as the proving mechanism is concerned, that any secondary counter be used. It is merely necessary to have the control pinions 10 positioned to control the operation of the machine immediately after the old balance has been entered in a machine the second time so that these pinions will become active to prevent a further operation, no matter what that operation may be.

*Release of machine after error has been made*

When an error has been made and the parts are conditioned to prevent operation of the machine, it is necessary to release them so that the error may be corrected and operations continued. When an error exists one or more of the pinions 10 are not in zero position and the amount in the main counter 916 is not the correct amount so that, prior to beginning the work over again, it not only is necessary to move all the pinions 10 to zero position but also to clear the main counter. It is, of course, also necessary to release the machine so that it may be operated.

The releasing of the machine is taken care of automatically by moving the paper carriage by hand back to its "pickup" column. In this column a small roll 130 (Fig. 3) comes into action to depress the lever 71. This roll is smaller than the roll 70 heretofore described and hence, in the "pickup" column, the lever 71 is not rocked downwardly as far as it is in the "proof" column. The movement is enough to push the link 76 forward sufficiently to cause projection 91 to move link 92 forward far enough to rock the shaft 98 to move the link 111 forward from its Fig. 10 position to a position such that its projection 113 is out of the path of the stud 114 as shown in Fig. 3 where the parts are shown conditioned in the "pickup" position of the carriage. This releases the starting link 9. The projection 90 on link 76 acts before the bifurcated end of link 76 engages the stud 77 on lever 36 and, consequently, the above described movement does not rock the lever 36 to move the counter rocking mechanism out of addition condition, which is its normal position and the position it occupies in the "pickup" column.

Accordingly, when the paper carriage is returned to the "pickup" column to begin the posting over again the controlling means for the motor drive is automatically freed for operation. The operator then depresses the usual "carriage normal" key, not shown, which disables the carriage tabulating mechanism so that the carriage will remain in the "pick-up" column. The machine is then given a blank stroke of operation to position the pinions 10 in alignment with the actuator racks and the operator then clears the proving mechanism by shifting the control lever 37 forward to total position, depressing the total key 265 and the motor bar. This causes an operation of the machine in which the pinions 10 are rocked into engagement with the racks 610 prior to the descent of the latter. As the racks descend they rotate the pinions 10 until said pinions are arrested by their pawls 60 which stop them in "0" position. The pinions are then rocked out of engagement with the racks which leaves them in "0" position. The main counter 916 is then cleared by depressing the total key 265 and the motor bar to operate the machine to take a total from said main counter and to clear it. In order to prevent the total on the main counter 916 from being transferred to the pinions 10 a non-add key for the shaft 11 is depressed to prevent the pinions 10 from being rocked into engagement with the racks. This key is not shown since it is well known. It moves the lever 40 shown in Fig. 1 to move link 45 to position stud 46 to enable pawl 47 to disable the pass-by pawl 32 which is engaged by cam 30 when the pinions 10 are rocked into engagement with the racks.

After the main counter 916 and the pinions 10 have been cleared, the "carriage normal" key is released which puts the tabulating mechanism in condition for operation.

In order that the operation of the machine may be more clearly understood, an example of work will be followed through, it being understood that the sample chosen is only one of many examples that may be performed.

*Example of work*

Operations are started with the carriage in its "pickup" column. The operator places a ledger sheet (Fig. 4) in the paper carriage and enters on the amount keys the old balance of $240.00 which he reads from the ledger sheet. He then depresses the motor bar and the machine is given a stroke of operation. At the time the operation takes place, the main counter is conditioned for addition and the devices for rocking pinions 10 into engagement with racks 610 are also in what may be termed addition condition so that the old balance is set up in the pinions 10 of the proving mechanism at the same time that the main counter receives it. As the stroke of operation is completed, the carriage automatically tabulates to its next columnar position where the proving mechanism is rendered inactive either through non-adding the control mechanism for the pinions 10 or by automatically moving the pinion shaft 11 longitudinally so as to move pinions 10 out of active position. In this manner the subsequent operations of the machine immediately following that in the "pickup" column take place independently of the proving mechanism which remains inactive.

The next operation, in the sample shown, is to enter a charge of $100.00 in the "charges" column. The operator enters this on the amount keys and gives the machine a stroke of operation which results in printing said amount in the "charges" column on the ledger and entering it additively on the main counter 916. At the end of the operation the machine tabulates to the next column which is the balance column.

In the balance column, a sub-total is taken and printed in the "balance" column of the ledger sheet, said new balance being allowed to remain in the main counter 916.

The carriage is then automatically returned to its right-hand or "proof" position by mechanism described in said Rinsche Patent No. 1,580,534, which positions it to print on the left-hand side of the proof strip illustrated in Fig. 4. The operator again enters the old balance of $240.00 which he again reads from the old balance in the "balance" column on the ledger sheet. In the example shown, he conditions the machine for subtraction so that, when the machine is given a stroke of operation, the old balance will be subtracted from the new balance in the main counter. In this "proof" column, the proof mechanism is again rendered active. The pinions 10 are automatically positioned for cooperation with the actuator racks, the mechanism for rocking the pinions into and out of engagement with the racks is automatically conditioned as if a total were to be taken, and the stop pawls 60 for the pinions 10 are disabled. As the actuator racks descend they rotate the pinions 10 reversely until the racks are stopped by the stop wires 270 set by the amount keys, which stop wires should be set for the amount of the old balance, $240.00. Consequently, when the machine is operated in the "proof" column and, if no error has been made, the pinions 10 will be returned to "0" position and the proof mechanism conditioned to permit the machine to be operated. The main counter will have left in it the amount of the charge, to-wit, $100.00. The main counter does not interfere with the descent of the racks because it is in subtraction condition, in which condition free descent of the racks is permitted in order to reversely rotate the main counter pinions until the racks are arrested by the stop wires 270.

If no error has been made, the carriage then tabulates to the "second proof" column where the machine may be operated. In this position the counter 12 is automatically moved to active position. The operation performed is to condition the machine to transfer the total in the main counter 916 to the selected secondary counter which, in this case, is the counter 12. When the machine is operated, the charge $100.00 will be accumulated in the selected counter 12 and the main counter will be cleared after which the carriage is tabulated to the "pickup" column where it is in condition for a second posting operation. At the end of a run a total may be taken from counter 12 to get a total of the charges and it will be observed that this total is of amounts left in the main counter after the posting operation. This total may be checked with another total that can be taken of the charges, the latter either being taken separately or on another counter which is conditioned to receive the charges as they are entered in the charges column.

If an error has occurred, that is, if the second entry of the old balance does not correspond to the first entry, the machine will not operate when the motor bar is depressed in the "second proof" column. No operations thus take place to disturb the condition of the counter 12 in which the charges are being accumulated and the operator is notified that an error has been made. It will be appreciated that if it were possible to operate the machine in this column the incorrect amount would be entered in the counter 12 and there would be consequent confusion in the total in this counter which is used to accumulate all of the charges for the run of work which is being performed.

As soon as the operator discovers that he cannot operate the machine by depressing the motor bar, he returns the paper carriage to the "pickup" column where the motor drive is automatically released as heretofore described. He then disables the tabulating mechanism, gives the machine a blank stroke of operation to align the pinions 10 with the actuator racks, conditions the machine as for taking a total from the pinions 10, depresses the total key 265 and gives the machine a stroke of operation which clears pinions 10. He next conditions the machine for taking a total from the counter 916 by depressing the usual total key and giving the machine a stroke of operation which cleans the main counter, the pinions 10 being non-added in the meantime. He then releases the tabulating mechanism and the machine is in condition for another posting operation.

The advantages of this construction will be readily apparent from the above description of the mechanism and its operation. The proving mechanism operates automatically without relying on the operator. It is not necessary for him to watch a signal or to manipulate any special part to test the machine for error. If he has made an error he cannot operate the machine and he is prevented from disturbing the condition of the counter 12 such as might occur if he were allowed to continue operations. As soon as he discovers an error he can quickly shift the carriage back to its "pickup" position and start over again without fumbling around for any special parts or without releasing the mechanism by operating special keys or levers. All he need do is to return the carriage to where he wants it for starting over again, whereupon the lock is automatically released after which he can clear the machine and start the operation a second time. A trained operator can do this very quickly and without inconvenience.

It is to be understood that the structure shown is for purposes of illustration and that variations may be made in it without departing from the spirit and scope of the invention as defined by the appended claims.

I claim:

1. In combination, in a calculating machine having amount keys, a counter for receiving items entered on said keys, and a traveling paper carriage; a proving mechanism associated with the machine and set by said machine during the entry of an item in said counter, means controlled by the paper carriage for automatically rendering said proving means inactive to permit subsequent operations of the machine independent of the proving mechanism, said means also serving to automatically render said proving mechanism active in a subsequent predetermined columnar position of the carriage where said first entered item is again entered in said counter, means controlled by said proving mechanism for preventing operation of the machine when said second entry of said item does not correspond with the first entry, and means for automatically releasing said machine when the paper carriage is moved back to the position it occupied when the first entry was made.

2. In combination, in a calculating machine having amount keys, a counter for receiving items entered on said keys, a traveling paper carriage, and a motor operated driving means for said machine; a proving mechanism actively associated with the machine in a predetermined columnar position of the carriage and set by the entry of an item in said machine, means controlled by said paper carriage for automatically rendering said proving means inactive to permit subsequent operations of the machine independent of the proving mechanism, said last named means also acting to automatically render said proving mechanism active in a subsequent predetermined columnar position of the carriage where said first entered item is again entered in the machine, means controlled by said proving mechanism for disabling said driving means when the second entry of the item does not correspond with the first, and means for automatically enabling said driving means when said paper carriage is returned to the columnar position it occupied when said first entry was made.

3. In combination, in a calculating machine having amount keys, a counter for receiving items entered on said keys, and a traveling paper carriage; a proving mechanism including a set of pinions for receiving an item entered in said machine, means controlled by said carriage for automatically moving said pinions to an inactive position to permit subsequent operations of the machine independent of the pinions, said means also acting to automatically move said pinions to active position in a subsequent predetermined columnar position of the carriage where said first entered item is again entered in said machine, mechanism controlled by the carriage for automatically conditioning the machine to cause the second entry of said item to be entered in said pinions reversely to the first entry, pawls for said pinions adapted to stop said pinions in their zero positions when reversely rotated, means controlled by the carriage in said subsequent columnar position for automatically disabling said pawls, and means controlled by the pinions for preventing subsequent operation of the machine when said pinions are not rotated to zero position by the second entry of said item.

4. In combination, in a calculating machine having amount keys, a paper carriage, and a counter for receiving items set up on said keys; a proving mechanism including pinions for receiving items entered in said machine, means controlled by said paper carriage for automatically moving said pinions to inactive positions after an item has been entered to permit subsequent operations of the machine independent of the pinions, said carriage controlled means also automatically moving said pinions to active position in a subsequent predetermined columnar position of the carriage where said first entered item is again entered, means for conditioning the machine to cause the second entry of said item to rotate the pinions reversely to the first entry, a pawl for each pinion for stopping it in its zero position when reversely rotated, connections operated by said conditioning means for disabling said pawls in said subsequent columnar position of the carriage, and means controlled by said pinions for preventing subsequent operation of the machine when the second entry of said item does not rotate said pinions to zero position.

5. In combination, in a calculating machine having amount keys, actuator racks, a multiple counter support, a traveling paper carriage, means controlled by said carriage for automatically moving said counter support to move selected counters to position for engagement with said racks, means for rocking said counter support to move selected counters into and out of engagement with said racks, and a controlling means for conditioning said rocking means for the taking of a total or sub-total from a selected counter; a proving mechanism including a series of pinions carried by said multiple counter support for receiving an item entered in the machine in a predetermined columnar position of the carriage, pawls adapted to arrest the pinions in zero positions when reversely rotated as in taking a total, connections controlled by said carriage in a subsequent predetermined columnar position thereof where said first entered item is again entered on said amount keys for automatically moving said pinions to active position and for conditioning said controlling means for total taking and for disabling said pawls, and means controlled by said pinions for preventing further operation of said machine when said second entry of said item through the amount keys does not rotate said pinions to zero positions.

6. In combination, in a calculating machine having amount keys and a counter for receiving items entered in said machine, a proving mechanism comprising a special set of pinions set automatically by rotation in one direction by operation of the machine during the entry of an item in said counter, pawls for arresting said pinions in zero position when they are reversely rotated, means acting to automatically move said pinions to inactive position after they have been set to thereby permit subsequent operation of said machine independently of said pinions, said means also acting to automatically move said pinions to active position and to disable said pawls for a subsequent operation of said machine where said item is to be reversely entered in said counter, and means controlled by said special pinions acting automatically to prevent further operation of the machine when said special pinions are not rotated to zero position by the second entry of said item.

7. In combination, in a calculating machine having actuator racks, a multiple counter support movable to selectively position different counters in active position for engagement with said racks, a transfer mechanism normally cooperating with each counter that is moved to selected position, operating means for moving said counter support to move the selected counter into and out of engagement with said racks and transfer mechanism, a proving mechanism including a special set of pinions mounted on said counter support, means for positioning said counter support to position said special pinions in active position relative to said racks for operation during the entry of an item in said machine, said support being automatically moved, after said pinions are set, to move said pinions to inactive position to permit subsequent operations of said machine and counter support independently of said special pinions, said special pinions being constructed so that, when selectively positioned for engagement with said racks, they do not cooperate with said transfer mechanism, means for automatically moving said counter support to move said proving mechanism into active position for a predetermined operation of said machine where said given item is to be again entered, and means controlled by said proving mechanism for preventing subsequent operation of the machine when the second entry of said item does not correspond in amount with the first entry thereof.

8. In combination, in a calculating machine having actuator racks, a multiple counter support movable to selectively position different counters in active position for engagement with said racks, a transfer mechanism normally cooperating with each counter when it is selectively positioned, operating means for moving the counter support to move the selected counter into and out of engagement with said racks and transfer mechanism, a proving mechanism including a special set of pinions mounted on said counter support, said special pinions being constructed so that, when moved to active position, they do not cooperate with said transfer mechanism, controlling mechanism for controlling the action of said operating means to cause said counter support to be moved into and out of engagement with the racks for addition and total taking, means for positioning said counter support to position said special pinions for operation during the entry of a given item in said machine, said counter support being moved, after said pinions have been set, to move said special pinions out of active position, means for automatically moving said counter support to move said pinions into active position for a predetermined subsequent operation of said machine where said given item is to be again entered, means automatically conditioning said controlling mechanism for total taking for said second entry of said item, and means controlled by said proving mechanism for preventing subsequent operation of the machine when the second entry of said item does not correspond in amount to the first entry thereof.

WALTER J. PASINSKI.